United States Patent
Kim

(10) Patent No.: US 12,116,000 B2
(45) Date of Patent: Oct. 15, 2024

(54) APPARATUS AND METHOD FOR CONTROLLING MOTOR DRIVEN POWER STEERING SYSTEM OF VEHICLE

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 134 days.

(21) Appl. No.: 17/811,159

(22) Filed: Jul. 7, 2022

(65) Prior Publication Data
US 2023/0126269 A1  Apr. 27, 2023

(30) Foreign Application Priority Data
Oct. 21, 2021  (KR) .................. 10-2021-0140913

(51) Int. Cl.
*B60W 50/00* (2006.01)
*B60W 60/00* (2020.01)
*B62D 15/02* (2006.01)

(52) U.S. Cl.
CPC .... *B60W 50/0098* (2013.01); *B60W 60/0015* (2020.02); *B60W 60/005* (2020.02);
(Continued)

(58) Field of Classification Search
CPC ...... B60W 30/09; B60W 10/18; B60W 10/20; B60W 30/0953; B60W 30/0956;
(Continued)

(56) References Cited

U.S. PATENT DOCUMENTS

2016/0280258 A1*  9/2016  Lavoie ................. B62D 5/0481
2020/0130727 A1*  4/2020  Kim .................... B62D 15/025
(Continued)

FOREIGN PATENT DOCUMENTS

KR  2017-0065793  6/2017

OTHER PUBLICATIONS

English Language Abstract of KR 2017-0065793 published Jun. 14, 2017.

*Primary Examiner* — Sze-Hon Kong
(74) *Attorney, Agent, or Firm* — DLA Piper LLP US

(57) ABSTRACT

An apparatus and method for controlling motor driven power steering system, the apparatus including: a column torque sensor detecting column torque applied to a steering column of a vehicle; an MDPS logic unit deciding a first command current based on the column torque and vehicle speed; a steering angle position control unit outputting a second command current for driving an MDPS motor in an autonomous driving mode, based on a command steering angle and a current steering angle inputted from an autonomous driving system and a steering angle sensor, respectively; a driver steering intervention determination unit monitoring the column torque of the column torque sensor in an autonomous driving mode, and determining whether a driver has intervened in steering; and an output control unit deciding a final command current by applying the weight decided by the driver steering intervention determination unit to the first and second command currents.

12 Claims, 4 Drawing Sheets

(52) U.S. Cl.
CPC ......... *B62D 15/021* (2013.01); *B62D 15/025* (2013.01); *B60W 2050/0056* (2013.01); *B60W 2510/202* (2013.01); *B60W 2520/10* (2013.01); *B60W 2540/18* (2013.01); *B60W 2710/202* (2013.01)

(58) Field of Classification Search
CPC .... B60W 40/04; B60W 40/076; B60W 40/09; B60W 40/112; B60W 50/0098; B60W 50/16; B60W 2050/0083; B60W 2050/143; B60W 2050/146; B60W 2300/36; B60W 2520/18; B60W 2540/18; B60W 2540/223; B60W 2552/30; B60W 2556/45; B60W 10/184; B60W 2520/10; B60W 2540/215; B60W 2554/80; B60W 2554/801; B60W 2556/65; B60W 40/08; B60W 50/14; B60W 30/095; B60W 60/0015; B60W 60/005; B60W 2050/0056; B60W 2510/202; B60W 2710/202; B60W 60/001; B60W 2050/0025; B60W 50/087; B60W 2710/207; B60W 40/105; B60W 60/0053; B60W 2050/0022; B60W 2050/0026; B60W 2050/0052; B60W 2422/50; H04W 4/40; G08G 1/166; B60Y 2200/12; B60Y 2300/09; B60Y 2300/095; B62D 15/021; B62D 15/025; B62D 6/007; B62D 1/286; B62D 5/0463; B62D 6/10
See application file for complete search history.

(56) References Cited

U.S. PATENT DOCUMENTS

2020/0317261 A1\* 10/2020 Shoji ..................... B60W 50/14
2023/0077259 A1\* 3/2023 Katzourakis ........ B60W 60/001

\* cited by examiner

The present disclosure has been made in an effort to provide an apparatus and method for controlling motor driven power steering system, which are capable of optimizing steering control authority of a vehicle according to a situation during autonomous driving, such that a driver can operate the vehicle more conveniently and more safely.

APPARATUS AND METHOD FOR CONTROLLING MOTOR DRIVEN POWER STEERING SYSTEM OF VEHICLE

CROSS-REFERENCE TO RELATED APPLICATION

This application claims priority from and the benefit of Korean Patent Application No. 10-2021-0140913, filed on Oct. 21, 2021, which is hereby incorporated by reference for all purposes as if set forth herein.

BACKGROUND

Field

Exemplary embodiments of the present disclosure relate to an apparatus and method for controlling an MDPS (Motor Driven Power Steering) system, and more particularly, to an apparatus and method for controlling an MDPS system, which can optimize a steering control authority over a vehicle depending on a situation during autonomous driving of the vehicle, such that a driver can operate the vehicle more conveniently and safely.

Discussion of the Background

A power steering system of a vehicle is a steering apparatus based on power, and serves to assist a driver to operate a steering wheel. Conventionally, such a power steering system had typically used hydraulic pressure. However, the use of an MDPS system using a motor force is recently increasing. That is because the MDPS system has a smaller weight and occupies a smaller space than an existing hydraulic power steering system, and does not require oil change.

The MDPS system determines a traveling condition of a vehicle through a torque sensor for measuring a driver's steering torque inputted to a steering wheel, a steering angle sensor for measuring a steering angle or steering angular velocity of the steering wheel, and a vehicle speed sensor for measuring vehicle speed. As the driver operates the steering wheel, the MDPS system provides assist torque through an electric motor based on steering torque applied to a steering shaft.

The autonomous vehicle recognizes a traveling road environment through an autonomous driving module (camera sensor, radar sensor, lidar sensor or the like) in an autonomous driving mode, and decides a command steering angle and command torque required for an operation of the MDPS system, in order to control the operation of the MDPS system applied to the autonomous vehicle. At this time, when the autonomous driving system abnormally operates, for example, when a sudden failure occurs in an autonomous driving module, a driver grasps the steering wheel and controls the operation of the vehicle by steering the vehicle according to the driver's intention.

Typically, when an emergency situation occurs or if necessary while the vehicle is operated by an autonomous driving function, a driver may grasp the steering wheel and steer the vehicle according to the driver's intention in some cases. Thus, it is important to control the output of the MDPS according to various situations.

In the related art, when column torque is equal to or more than a predetermined level or the level is maintained for a predetermined time or more in case of a driver's intervention in steering during autonomous driving, the autonomous driving system determines that the driver has intervened in steering, and cancels the autonomous driving mode. However, such an algorithm does not cancel the autonomous driving mode for a predetermined time, when the driver suddenly steers the vehicle during autonomous driving. In this case, considerable locking feel may last to threaten the driver's safety.

Thus, there is a need for the development of technology that does not cancel the autonomous driving mode in case of a driver's unintended steering intervention in the autonomous driving mode of the vehicle, thereby increasing the convenience and stability.

The related art of the present disclosure is disclosed in Korean Patent Publication No. 10-2017-0065793 published on Jun. 14, 2017.

SUMMARY

The present disclosure has been made in an effort to provide an apparatus and method for controlling motor driven power steering system, which are capable of optimizing steering control authority of a vehicle according to a situation during autonomous driving, such that a driver can operate the vehicle more conveniently and more safely.

Technical problems to be solved by the present invention are not limited to the above-mentioned technical problem(s), and other technical problem(s), which are not mentioned above, may be clearly understood by those skilled in the art from the following descriptions.

Various embodiments are directed to an apparatus for controlling an MDPS (Motor Driven Power Steering) system, including: a column torque sensor configured to detect column torque applied to a steering column of a vehicle; an MDPS logic unit configured to decide a first command current based on the column torque and vehicle speed, which are detected by the column torque sensor and a vehicle speed sensor, respectively; a steering angle position control unit configured to output a second command current for driving an MDPS motor in an autonomous driving mode, based on a command steering angle inputted from an autonomous driving system and a current steering angle inputted from a steering angle sensor; a driver steering intervention determination unit configured to monitor the column torque of the column torque sensor in an autonomous driving mode of the vehicle, and determine whether a driver has intervened in steering; and an output control unit configured to decide a final command current by applying the weight decided by the driver steering intervention determination unit to the first and second command currents, when the driver's steering intervention occurs in the autonomous driving mode of the vehicle.

The driver steering intervention determination unit includes: a filter unit configured to perform noise filtering on the column torque detected by the column torque sensor through a BSF (Band Stop Filter); a steering intervention determination unit configured to adjust a holding period reference value which is a driver steering intervention determination reference time, according to the magnitude of the column torque filtered by the filter unit, and determine that the driver has intervened in steering, when the state in which the magnitude of the filtered column torque is equal to or more than a preset reference value is maintained for the adjusted holding period reference value; and a weight calculation unit configured to acquire, as a weight, a blending period corresponding to the column torque when the holding period of the filtered column torque reaches the holding period reference value.

The apparatus may further include a steering angle acceleration calculation unit configured to calculate steering angle acceleration by differentiating the command steering angle, in which the filter unit removes noise of the steering angle acceleration through LPF processing, and the steering intervention determination unit raises the holding period reference value based on the steering angle acceleration from which the noise has been removed, such that the autonomous driving mode is not canceled.

The steering intervention determination unit includes a table map in which a holding period reference value for the magnitude of each column torque is stored, extracts a holding period reference value corresponding to the magnitude of the column torque detected through the column torque sensor from the table map, and adjusts the holding period reference value.

The weight calculation unit acquires a blending period, corresponding to the column torque when a holding period reaches the holding period reference value, from a column torque weight table in which a blending period is matched with each column torque, in which the acquired blending period is acquired as the weight.

The driver steering intervention determination unit may further include a steering angle phase detection unit configured to detect the phase of a steering angle from the steering angle sensor and the phase of a motor angle from an MDPS motor, respectively, and determine whether the driver has intervened in steering, based on the detected phases of the steering angle and the motor angle.

When the phase of the motor angle is detected before the phase of the steering angle, the steering angle phase detection unit determines that the driver does not intervene in steering.

Various embodiments are directed to a method for controlling an MDPS system, including: deciding, by an MDPS logic unit, a first command current based on column torque and vehicle speed, which are detected by a column torque sensor and a vehicle speed sensor, respectively; deciding, by a steering angle position control unit, a second command current for driving an MDPS motor in an autonomous driving mode, based on a command steering angle inputted from an autonomous driving system and a current steering angle inputted from a steering angle sensor, and driving the MDPS motor; determining, by a driver steering intervention determination unit, whether a driver has intervened in steering, by monitoring the column torque of the column torque sensor in the autonomous driving mode; and deciding, by an output control unit, a final command current by applying the weight, decided by the driver steering intervention determination unit, to the first and second command currents, when the driver's steering intervention occurs in the autonomous driving mode of the vehicle.

The determining of whether the driver has intervened in steering, includes: performing, by a filter unit, noise filtering on the column torque detected by the column torque sensor through a BSF; adjusting, by a steering intervention determination unit, a holding period reference value which is a driver steering intervention determination reference time, according to the magnitude of the column torque filtered by the filter unit, and determining that the driver has intervened in steering, when the state in which the magnitude of the filtered column torque is equal to or more than a preset reference value is maintained for the adjusted holding period reference value; and acquiring, by a weight calculation unit, a blending period, corresponding to the column torque when the holding period of the filtered column torque reaches the holding period reference value, as a weight.

In the performing of the noise filtering, the filter unit removes noise of steering angle acceleration through LPF processing, when the steering angle acceleration calculation unit calculates the steering angle acceleration by differentiating the command steering angle, and in the determining of whether the driver has intervened in steering, the steering intervention determination unit raises the holding period reference value based on the value from which the noise has been removed, such that the autonomous driving mode is not canceled.

In the determining of whether the driver has intervened in steering, the steering intervention determination unit includes a table map in which a holding period reference value for the magnitude of each column torque is stored, extracts a holding period reference value corresponding to the magnitude of the column torque detected through the column torque sensor from the table map, and adjusts the holding period reference value.

In the acquiring of the blending period, the weight calculation unit acquires a blending period, corresponding to the column torque when a holding period reaches the holding period reference value, from a column torque weight table in which a blending period is matched with each column torque, in which the blending period is acquired as the weight.

The method may further include detecting, by a steering angle phase detection unit, the phase of a steering angle from the steering angle sensor and the phase of a motor angle from an MDPS motor, and determining whether the driver has intervened in steering, based on the detected phases of the steering angle and the motor angle.

In the determining of whether the driver has intervened in steering, based on the detected phases of the steering angle and the motor angle, when the phase of the motor angle is detected before the phase of the steering angle, the steering angle phase detection unit determines that the driver does not intervene in steering.

As described above, when a driver rapidly cancels the autonomous driving mode and drives the vehicle in person because the driver does not instantaneously want autonomous driving or a driver's steering intervention is required to avoid an obstacle due to a momentary error of the autonomous driving system, the apparatus and method for controlling an MDPS in accordance with the embodiments of the present disclosure may accurately detect the situation, and transfer a steering authority to the driver. When the driver hands off the steering wheel, the apparatus and method may maintain the autonomous driving mode. Thus, the autonomous driving may smoothly transition depending on a situation, and the driver's convenience and safety may be maximized.

The apparatus and method for controlling an MDPS in accordance with the embodiments of the present disclosure may accurately recognize a driver's steering intervention, and prevent an unintended autonomous driving mode cancelation, thereby maximizing the driver's convenience.

The apparatus and method for controlling an MDPS in accordance with the embodiments of the present disclosure may vary the driver steering intervention determination condition in case of sudden steering depending on an emergency situation, thereby preventing an unintended mode cancelation.

Meanwhile, the effects of the present disclosure are not limited to the above-mentioned effects, and various effects

DETAILED DESCRIPTION OF THE ILLUSTRATED EMBODIMENTS

Figure 1:
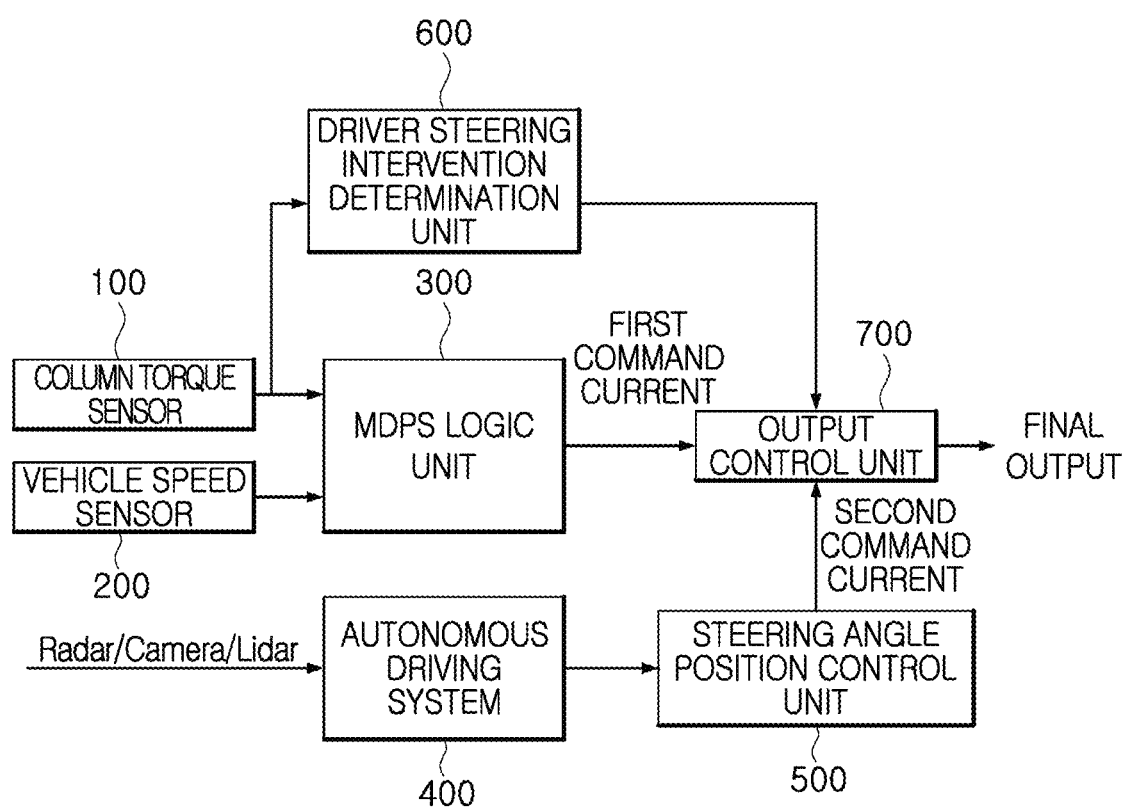
FIG. 1 is a block diagram illustrating an apparatus for controlling an MDPS system in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Figure 2:
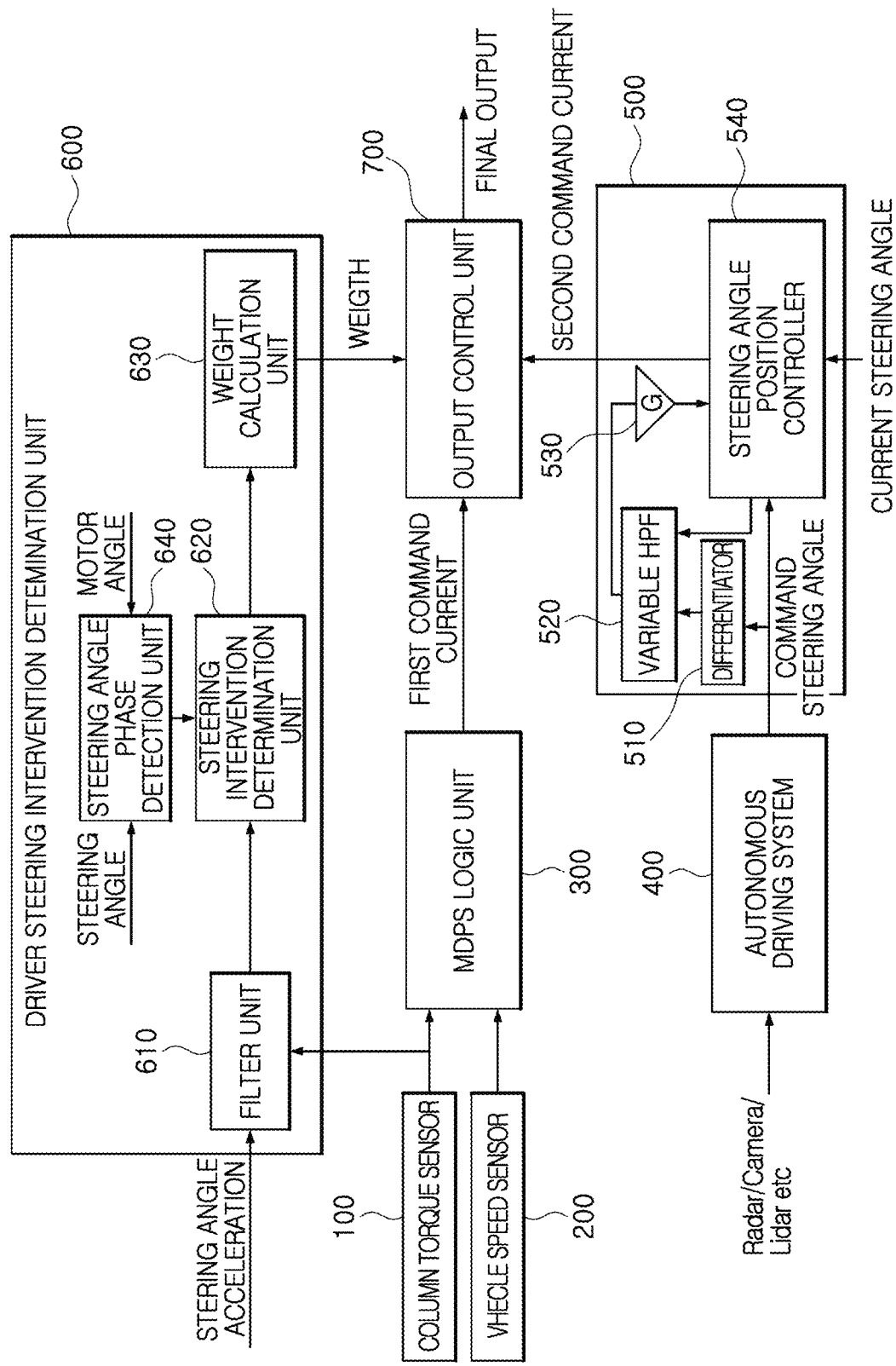
FIG. 2 is a block diagram illustrating a detailed configuration of the apparatus for controlling an MDPS system, illustrated in FIG. 1.
Figure 3:
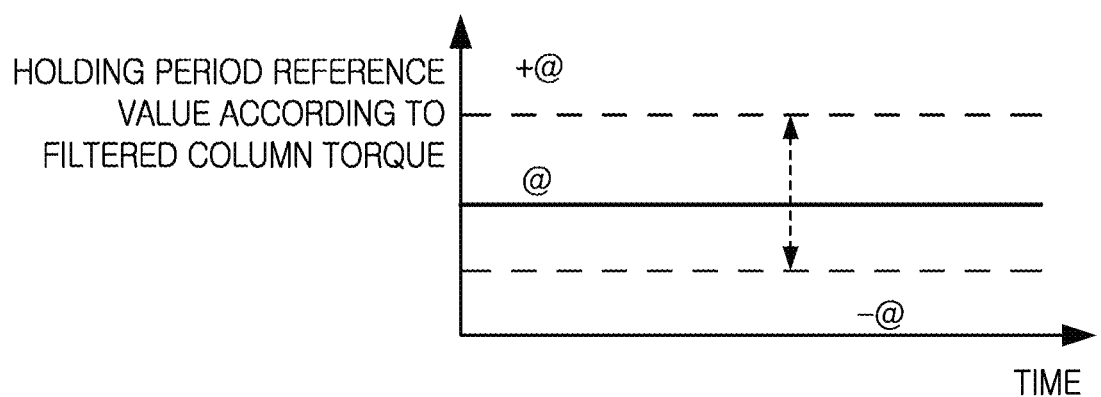
FIG. 3 is an exemplary diagram for describing a holding period reference value in accordance with an embodiment of the present disclosure.
Figure 4:
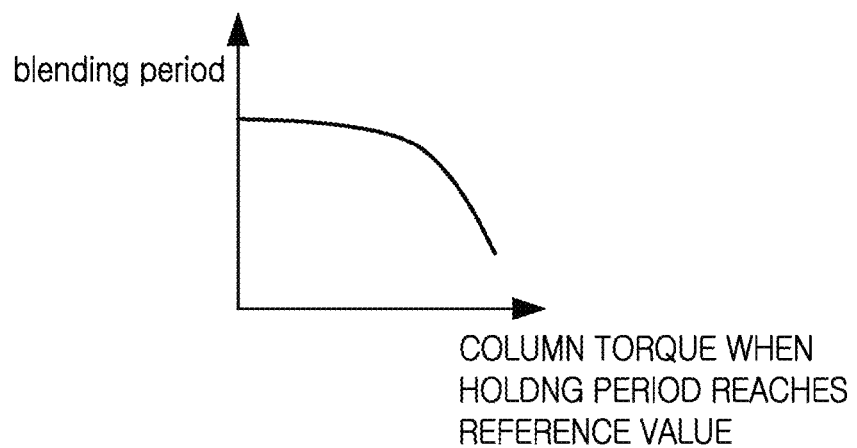
FIG. 4 is an exemplary diagram for describing a weight in accordance with an embodiment of the present disclosure.

FIG. 1 is a block diagram illustrating an apparatus for controlling an MDPS system in accordance with an embodiment of the present disclosure, FIG. 2 is a block diagram illustrating a detailed configuration of the apparatus for controlling an MDPS system, illustrated in FIG. 1, FIG. 3 is an exemplary diagram for describing a holding period reference value in accordance with an embodiment of the present disclosure, and FIG. 4 is an exemplary diagram for describing a weight in accordance with an embodiment of the present disclosure.

Referring to FIGS. 1 and 2, the apparatus for controlling an MDPS system in accordance with the embodiment of the present disclosure may include a column torque sensor 100, a vehicle speed sensor 200, an MDPS logic unit 300, an autonomous driving system 400, a steering angle position control unit 500, a driver steering intervention determination unit 600, and an output control unit 700.

The column torque sensor 100 may detect column torque applied to a steering column of the vehicle, and transfer the detected column torque to the MDPS logic unit 300 and the driver steering intervention determination unit 600, which will be described below. The column torque applied to the steering column may include not only column torque applied by a driver, but also column torque by a lateral force applied to the vehicle due to a road condition and driving environment.

The vehicle speed sensor 200 may detect the vehicle speed of the vehicle in driving. The vehicle speed sensor 200 may include various sensors such as a sensor for detecting vehicle speed by using rotation speed of a wheel, a sensor for detecting vehicle speed by measuring an engine RPM (Revolution Per Minute), and a sensor for detecting vehicle speed by using GPS (Global Positioning System).

The steering angle sensor (not illustrated) senses the steering angle and the steering angular velocity of a steering wheel. That is, the steering angle sensor includes an optical sensor to sense the steering angle, and detects the steering angular velocity by differentiating the steering angle with respect to time.

The MDPS logic unit 300 may decide a first command current for driving an MDPS motor (not illustrated) in a manual driving mode of a driver, based on the column torque and the vehicle speed which are detected by the column torque sensor 100 and the vehicle speed sensor 200, respectively. The MDPS logic unit 300 may decide the first command current for driving the MDPS motor in the manual driving mode by applying a boost curve to the column torque and the vehicle speed.

The MDPS logic unit 300 calculates the first command current based on column torque generated by the twist of a torsion bar, according to the driver's steering intention, and controls the MDPS motor to provide an assist output, when the vehicle is not in the autonomous driving mode.

The autonomous driving system 400 generates a command steering angle through a driving environment of the vehicle, detected by the autonomous module (e.g. camera sensor, radar sensor, lidar sensor or the like) mounted on the vehicle. That is, the autonomous driving system 400 recognizes a lane or obstacle through a radar or camera, performs path following, and generates a command steering angle, in order to perform autonomous driving.

The steering angle position control unit 500 decides a second command current for driving the MDPS motor in the autonomous driving mode, based on the command steering angle decided by the autonomous driving system 400, the vehicle speed detected by the vehicle speed sensor 200, and the current steering angle of the vehicle from a steering angle sensor (not illustrated). That is, the steering angle position control unit 500 receives the command steering angle generated by the autonomous driving system 400, and control the MDPS motor to steer the vehicle to a desired position.

Such a steering angle position control unit 500 may include a differentiator 510, a variable HPF (High-Pass Filter) 520, a gain adjuster 530, and a steering angle position controller 540.

The differentiator 510 detects a command steering angular velocity by differentiating the command steering angle inputted from the autonomous driving system 400.

The variable HPF 520 removes noise components of a position control error between the command steering angle and the current steering angle by adjusting a cut-off frequency according to the output from the differentiator 510. In this case, the variable HPF 520 adjusts the cut-off frequency by adjusting the differentiation time of a transfer function of the command steering angular velocity inputted from the differentiator 510.

Typically, in order to instantaneously avoid an obstacle or the like, steering angle control performance needs to be momentarily amplified.

When the steering angle control performance is excessively high in a general autonomous driving mode, the control stability is degraded by external noise or surrounding environment. In this case, vibration or the like may be generated, and the steering angle control performance may be rather degraded. Therefore, it is very important to raise the steering angle control performance as much as possible at a necessary point of time.

For this operation, it is effective to use a position controller configured as a PI-P or PID-PI controller, without using a P-PI controller which is generally used. However, when a D controller is applied, vibration may be generated by noise of the command steering angle, external environment, or noise. In general, the D controller may be added to raise the responsiveness to a change in position. In this case, the change in position may be amplified by disturbance or noise introduced from the external environment, and cause vibration. Therefore, the steering angle control performance may be rather degraded.

In order to prevent the degradation, a low pass filter or lag compensator is generally applied to the previous stage of the D controller. However, when the structure becomes complex and needs to be varied depending on a steering situation, the number of parameters or factors to be changed is increased. That is, in order to secure the steering angle control performance, a PI-PI or PID-PI controller may be configured by changing the P controller to the PI or PID controller. However, there is a need for a method which is more efficient, and can maximize steering angle control performance depending on a steering situation, and significantly improve responsiveness while being robust to noise or disturbance.

Typically, when a LPF or lag compensator is applied to the D controller of the PID controller, an equation of $G(s)=Kp(1+1/Ti \times s+Td \times s/(1+s \times Td))$ may be established. Here, $G(s)$ represents a transfer function, $Kp$ represents a proportional gain, $Ti$ represents the integration time, $Td$ represents the differentiation time, and $s$ represents a complex number.

When a PID control gain is separated to solve the equation again (that is, the proportional gain Kp is separated according to the I or D controller), the equation may be expressed as $G(s)=kp+Ki/Ti \times s+Kd \times s/(1+Td \times s)$. At this time, when the D control is arranged again, $(1/Td)/((1/Td)+s)) \times Td \times Kp \times s$ is obtained. Here, Ki represents an integration gain, and Kd represents a differentiation gain.

Furthermore, $(1/Td)/((1/Td)+s))$ and s are similar to the form of a primary HPF. That is, when a lag or LPF is not applied to the D controller, but a specialized D control gain is set and an HPF is applied thereto, it is possible to build a structure which can raise responsiveness while being robust to noise or disturbance.

In an application, the D controller may not be applied, and the variable HPF 520 and the gain control unit 530 may be applied to improve steering angle control performance. In this case, the resultant structure is robust to noise while the steering angle control performance is significantly improved.

In particular, the gain and the cut-off frequency of the variable HPF 520 are very important. In general, the cut-off frequency of the HPF may be set by applying the motor control bandwidth of an electric power steering apparatus, e.g. MDPS. However, in order to remove the influence on the resonance point of the torsion bar of the MDPS, it is important to set the cut-off frequency of the HPF with a cut-off point set to 12 Hz for C-MDPS or 9 Hz for R-MDPS. For reference, the torsion bar plays the biggest role in the stability of the MDPS. This is because the torsion bar has the lowest stiffness, and resonance most easily occurs in the torsion bar.

In general, Td may define the control period and the frequency of the D controller in the PID controller. Furthermore, $(1/Td)/((1/Td)+s))$ in $(1/Td)/((1/Td)+s)) \times Td \times Kp \times s$ of the transfer function is equal to that of the HPF, and may be set to a desired frequency through 1/Td. That is, the transfer function of a general HPF may be expressed as $s/(s+w)$. Here, $w$ is $2\pi f$ where f represents a cut-off frequency. In the above-described transfer function, 1/Td becomes w. Thus, the variable HPF 520 may adjust the cut-off frequency by varying Td in order to set a desired frequency.

When the command steering angle of the steering angle position control unit 500 is high, the cut-off frequency of the variable HPF 520 may be lowered, or the required gain and the frequency response of a steering region may be raised. On the other hand, when the command steering angle is low, the cut-off frequency of the HPF 520 may be shifted backward so as to be insensitive to noise, and does not respond to vibration or disturbance. In this case, when sudden steering avoidance is required during autonomous driving, position control can be effectively and actively performed. When the control response is continuously raised, disturbance or noise is amplified to degrade the performance of the position control, during general driving. In a specified case, however, such a control is necessarily required for improving the safety of the driver. That is, the variable HPF 520 may receive error values of the current steering angle and the command steering angle, and the cut-off frequency may be decided according to the command steering angular velocity.

The gain adjuster 530 varies the differentiation gain Kd in order to control the gain. That is, the gain adjuster 530 may adjust the gain G through $G=Kp*Td$. The gain adjuster 530 may vary the gain response characteristic of the steering angle position control unit 500 by increasing Kd as the steering angle acceleration in the transfer function is high, and decreasing Kd as the steering angle acceleration is low.

Important factors to decide the gain are the vehicle speed and the command steering angle acceleration. In order to decide a load of the vehicle and a load applied to the MDPS, the vehicle speed and the command steering angle acceleration need to be considered.

Thus, the gain adjuster 530 finally sets the gain by multiplying a load curve gain value based on the vehicle speed, the command steering angle acceleration, and a ratio for maintaining a proper parameter. Here, the ratio may be set to various values in consideration of various sudden steering environments under an actual autonomous driving condition.

The steering angle position controller 540 corrects a steering angle error between the command steering angle and the current steering angle by controlling the steering angle according to the gain adjusted by the gain adjuster 530.

That is, the steering angle position controller 540 compares the command steering angle inputted from the autonomous driving system 400 to the current steering angle inputted from the steering angle sensor, and inputs the steering angle error to the variable HPF 520.

Furthermore, the steering angle position controller 540 may improve the response characteristic of the steering angle according to the gain inputted from the gain adjuster 530, and minimize the error between the command steering angle and the current steering angle.

The driver steering intervention determination unit 600 determines whether the driver intervenes in steering.

That is, the driver steering intervention determination unit 600 may monitor the column torque detected by the column torque sensor 100 in the autonomous driving mode of the vehicle, and determine whether the driver has intervened in steering. At this time, the driver steering intervention determination unit 600 may vary a driver steering intervention determination condition, and prevent unintended mode cancelation.

According to the related art, when the state in which the magnitude of the column torque is equal to or more than a preset reference value is maintained for a predetermined reference time, the driver steering intervention determination unit 600 may determine that the driver intervenes in steering, and adjust the time at which the steering mode transitions, according to the column torque at this time. In this case, however, when the driver performs sudden steering during autonomous driving, predetermined torque or more needs to be unconditionally maintained for a predetermined time or more. Thus, since the steering is not performed for the predetermined time, considerable locking feeling or sense of difference may occur. Then, since the steering is not performed as intended by the driver, it is impossible to secure the driver's safety under a sudden steering condition in case of emergency avoidance or if necessary.

In order to prevent such a situation, the driver steering intervention determination unit 600 in accordance with the present disclosure may include a steering intervention determination unit 620 configured to variably change a holding period reference value according to the column torque which is generated when the driver intervenes in steering.

The steering intervention determination unit 620 may adjust the holding period reference value which is a driver steering intervention determination reference time, according to the magnitude of the column torque. When the state in which the magnitude of the column torque is equal to or more than the preset reference value is maintained for the adjusted holding period reference value or more, the steering intervention determination unit 620 may determine that the driver intervenes in steering. When the column torque equal to or more than a predetermined level was generated, it may indicate that the torsion bar has been twisted, and a target steering angle during autonomous driving is different from a steering angle desired by the driver. The holding period reference value based on the magnitude of the column torque is stored in a table map in advance. For example, a holding period of 50 ms may be stored in the table map when the column torque is 4 Nm, a holding period of 40 ms may be stored in the table map when the column torque is 6 Nm, a holding period of 30 ms may be stored in the table map when the column torque is 7 Nm, a holding period of 20 ms may be stored in the table map when the column torque is 8 Nm, and a holding period of 10 ms may be stored in the table map when the column torque is 9 Nm. Therefore, the steering intervention determination unit 620 may extract a holding period corresponding to the magnitude of the column torque detected through the column torque sensor 100 from the table map, and adjust the holding period reference value.

When large column torque occurs under an emergency steering condition, the steering intervention determination unit 620 may decrease the holding period reference value which is the driver steering intervention determination reference time, thereby rapidly processing the driver steering mode. For example, based on the table map in which a holding period of 50 ms for column torque of 4 Nm, a holding period of 40 ms for column torque of 6 Nm, a holding period of 30 ms for column torques of 7 Nm, a holding period of 20 ms for column torque of 8 Nm, and a holding period of 10 ms for column torque of 9 Nm are stored, the steering intervention determination unit 620 may decrease the holding period reference value which is the driver steering intervention reference time, as the column torque is increased as illustrated in FIG. 3, In this case, when the driver suddenly steers the vehicle, the column torque naturally increases. At this time, the holding period rapidly reaches the holding period reference value, and the steering mode can immediately transition. The smaller the column torque, the larger the holding period reference value. As the column torque converges to 0, the holding period reference value increases to infinity. That is, the driver steering intervention determination is not performed.

The driver steering intervention determination unit 600 may monitor the column torque to determine whether the driver intervenes in steering. However, when the column torque bounces due to the vibration of the road, the autonomous driving may be canceled. That is, when the state in which the column torque which is generated in case of an unintended steering intervention is equal to or more than a predetermined level satisfies even the holding period reference value, the autonomous driving mode may be unintentionally canceled. In this case, the driver's safety as well as the driver's convenience cannot be guaranteed. In case of unintended steering intervention, the column torque generates vibration at a predetermined frequency due to the influence of the torsion bar of the MDPS, a steering wheel, and a U-joint. When the driver unintentionally intervenes in steering (e.g. a user's touch on the steering wheel or steering intervention misrecognized by the influence of vibration caused by the road), vibration similar to the resonance point of the torsion bar of the MDPS, (i.e. the same vibration frequency as the resonance point of the torsion bar within an error range), may be generated.

Therefore, the driver steering intervention determination unit 600 needs to remove column torque which is generated in case of the driver's unintended steering intervention. The driver steering intervention determination unit 600 may include a filter unit 610.

The filter unit 610 may perform noise filtering on the column torque detected by the column torque sensor 100 through a BSF (Band Stop Filter). That is, in case of a user's unintended steering intervention (e.g. a user's touch on the steering wheel or steering intervention misrecognized by the influence of vibration caused by the road), vibration similar to the resonance point of the torsion bar of the MDPS, i.e. the same vibration frequency as the resonance point of the torsion bar within the error range, may be generated. In this case, the filter unit 610 may remove the column torque of the corresponding frequency component, (i.e., the column torque of the frequency component generated by the user's unintended steering intervention) by filtering the column torque through the BSF The ideal method for removing the column torque of the frequency component generated by the user's unintended steering intervention is to find the resonance frequency considering the inertia and stiffness of the steering wheel and the torsion bar in the MDPS, and to accurately filter the resonance frequency through the BSF.

Typically, the resonance frequency may be derived through $$1/(2*pi)*\sqrt{\frac{K}{J}}.$$

Here, K may follow the characteristic of the torsion bar, and typically range from 2.1 to 2.8 Nm/deg. Since J is changed according to the diameter and the steering angle acceleration of the U-joint and the steering wheel, J may be decided through a test, and the value obtained through the test may range from 8 to 10 Hz based on a test vehicle. Generally, the inertia moment J may be influenced by the steering angle acceleration. When the steering angle acceleration value is high, the frequency of the BSF may be designated as 10 Hz, and when the steering angle acceleration value is low, the frequency of the BSF may be designated as 8 Hz. In this case, the resonance frequency value for each steering angle acceleration may be stored in a table, and variably applied. Since the resonance frequency value is different for each vehicle, a tuning map is derived through a test. When such a method is applied, a vibration signal which is generated according to a driver's unintended steering may be filtered. When a holding period or a blending period is decided on the basis of the filtered vibration signal, it is possible to more accurately determine the driver's steering intervention intention.

Thus, although the column torque bounces as the driver touches the steering wheel during driving or the vehicle travels over an obstacle on the road, the autonomous driving is maintained. When the driver suddenly steers the vehicle in case of necessity, the autonomous driving mode may immediately transition. Thus, the function of transferring the steering authority to the driver during autonomous driving may be more effectively performed.

The above-described process is based on the point of view that the driver intervenes in steering during autonomous driving. However, a condition such as emergent obstacle avoidance also needs to be considered during autonomous driving. This is because, even when a sudden steering command such as obstacle avoidance is applied to the autonomous driving system 400, actual column torque significantly rises. In this case, the column torque is increased according to the intention of the autonomous driving. Thus, the autonomous driving mode must not be canceled.

That is, when emergency steering is performed by the autonomous driving system 400, the column torque is significantly increased while the torsion bar is instantaneously rapidly twisted. Thus, the driver steering intervention determination unit 600 may wrongly determine that the emergency steering is a steering operation intended by the driver.

In this case, the autonomous driving mode may be canceled. However, the emergency steering by the autonomous driving system 400 is not a general predetermined autonomous driving condition.

Therefore, the autonomous driving mode may be canceled according to an existing autonomous driving cancellation condition in which the autonomous driving mode is canceled when the column torque is equal to or higher than a predetermined level.

That is, when the autonomous driving system 400 issues a sudden steering command to avoid an obstacle, the column torque rises. However, when the driver steering intervention determination unit 600 determines that the rise of the column torque is a steering intervention intended by the driver and cancels the autonomous driving mode, the vehicle may not avoid the obstacle but collide with the obstacle.

In order to avoid such a situation in which the driver steering intervention determination unit 600 wrongly determines that the driver intervenes in steering in case of the sudden steering by the autonomous driving system 400, the driver steering intervention determination unit 600 needs to calculate the steering angle acceleration by using the command steering angle outputted from the autonomous driving system 400. The driver steering intervention determination unit 600 may further include a steering angle acceleration calculation unit (not illustrated) configured to calculate the steering angle acceleration by differentiating the command steering angle outputted by the autonomous driving system 400.

In general, rotation torque is proportional to the product of rotation inertia moment and the steering angle acceleration. Thus, when the command steering angle acceleration is equal to or more than a designated reference value, an increase in rotation torque may be expected. Therefore, the steering angle acceleration calculation unit calculates the steering angle acceleration by differentiating the command steering angle, outputted from the autonomous driving system 400, twice through a first differentiator (not illustrated) and a second differentiator (not illustrated), and the filter unit 610 processes and corrects noise generated at this time through an LPF (not illustrated). When the steering angle acceleration corrected and outputted through the LPF is equal to or more than a designated reference value, the driver steering intervention determination unit 600 may forbid the cancellation of the autonomous driving mode.

For reference, the magnitude of the steering angle acceleration for forbidding the cancellation of the autonomous driving mode indicates an instantaneous change in turning angle of the vehicle, and does not need to be changed according to the characteristic of the vehicle. Thus, the reference steering angle acceleration may be decided through a test, applied to a memory (not illustrated), and then used for all types of vehicles.

The steering angle acceleration calculation unit may calculate the steering angle acceleration by differentiating the command steering angle twice, and the filter unit may perform LPF processing on the steering angle acceleration in order to remove noise. The steering intervention determination unit 620 may raise the holding period reference value based on the LPF-processed value, such that the autonomous driving mode is not canceled.

In this case, when the autonomous driving system performs emergency steering such that the column torque rises even though the driver does not turn the steering wheel, the autonomous driving mode may be maintained without canceling the same. However, a mode transition may occur due to the phenomenon in which the column torque rises while the driver does not intervene.

In reality, as the autonomous driving level rises, the forward concentration or steering intervention authority of the driver is reduced. When the autonomous driving system determines that emergency avoidance or sudden turning is required and performs autonomous steering, the angle of the motor at the bottom of the MDPS is first changed, and the torsion bar is naturally twisted to raise the column torque.

In this case, an existing algorithm determines whether the driver intervenes in steering, based on only the column torque value. When the autonomous driving mode transitions to the driver steering mode based on only the column torque value increased by autonomous driving, the driver's safety may be threatened in case that the driver does not respond to the transition. Thus, there is a need for an additional countermeasure for preventing the above-described situation. The driver steering intervention determination unit 600 may further include a steering angle phase detection unit 640 configured to compare the steering angle detected by the steering angle sensor to the motor angle from the motor, and determine whether the driver intervenes in steering.

The steering angle phase detection unit 640 may detect the phase of the steering angle from the steering angle sensor and the phase of the motor angle from the motor. When the phase of the motor angle is first detected between the phase of the steering angle and the phase of the motor angle, the steering angle phase detection unit 640 may determine that the driver does not intervene in steering.

In order to determine whether the driver intervenes in steering, the key is how to properly vary the holding period or a column torque threshold which is set to recognize that the driver intervenes in steering. The important thing is that, when sudden steering is performed in the autonomous driving mode, the phase of the motor angle needs to lead the phase of the steering angle from the steering angle sensor. At this time, the column torque value for driver steering intervention determination may be raised, or the holding period reference value may be significantly increased. Then, the autonomous driving mode needs to be maintained so that the autonomous driving is sufficiently performed. In case of general driver steering intervention, a change in steering angle from the steering angle sensor leads a change in the motor angle. In this case, the holding period reference value or the column torque threshold may be lowered to immediately cancel the autonomous driving mode when the driver wants to suddenly steer the vehicle.

In this case, it is important to detect the phases of the motor angle and the steering angle. However, when the phase of the motor angle leads the phase of the steering angle from the steering angle sensor due to external shock and the column torque rises, the autonomous driving mode needs to be maintained. This needs to be controlled on the basis of the filtered value of the column torque. As such, the steering angle phase detection unit 640 needs to accurately determine whether the driver's steering intervention is required or the autonomous driving needs to be maintained, by using the steering angle and the motor angle, in order to secure the driver's safety during autonomous driving.

The steering intervention determination unit 620 may monitor the column torque filtered by the filter unit 610, and determine whether the driver has intervened in steering. At this time, the steering intervention determination unit 620 may variably change the holding period reference value according to the magnitude of the noise-filtered column torque. The steering intervention determination unit 620 may determine that the driver intervenes in steering, when the magnitude of the filtered column torque is maintained for the holding period reference value or more.

The driver steering intervention determination unit 600 may further include a weight calculation unit 630 configured to calculate, as a weight, a blending period corresponding to the column torque when the holding period reaches the holding period reference value. At this time, as illustrated in FIG. 4, a column torque weight table in which the blending period is matched with each column torque is stored in the weight calculation unit 630 in advance. Therefore, the weight calculation unit 630 may extract, as a weight, a blending period corresponding to the column torque when the holding period reaches the holding period reference value. That is, when the holding period reference value is satisfied according to the column torque filtering, the weight calculation unit 630 calculates a weight corresponding to the column torque when the holding period reaches the holding period reference value.

When the determination result of the driver steering intervention determination unit 600 indicates that the driver has intervened in steering in the autonomous driving mode, the output of the autonomous driving needs to be reduced, and the MDPS motor needs to be controlled by an output through the driver's intention. For this operation, the output control unit 700 controls the magnitude of the final output through a weight filter, i.e. an exponential smoothing filter.

The output control unit 700 blends the actual autonomous control output and the output value of the MDPS logic unit 300 through the blending period. Through the blending period that is set according to the column torque at the point of time that the holding period reference value is satisfied, the output values may be blended. For example, when the column torque at the point of time that the holding period reference value is satisfied is 6 Nm and the blending period required at this time is 200 ms, the output control unit 700 may change the autonomous driving output to the MDPS output within 200 ms.

At this time, the output control unit 700 may control the magnitude of the final output by using Equation 1 below.

$$C = AK + (1-K)B \qquad \text{[Equation 1]}$$

Here, C represents the final output, K represents a weight, A represents an output of the MDPS logic unit 300 (i.e. the amount of command current (first command current) generated when the driver steers the vehicle), and B represents the amount of command current (second command current) generated during autonomous driving. The weight K may range from 0 to 1. When the weight K is 1, (1−K)B becomes 0, and the final output C is adjusted by the output A. When the blending period is 200 ms, the weight is first set to 0 (=0/200). When the numerator is changed, the numerator is changed from 0 to 200. As a result, the weight K is changed from 0 to 1.

The above-described configuration may remove the condition in which the holding period reference value is varied depending on how the driver intervenes in steering during autonomous driving, and a predetermined time needs to be unconditionally maintained in case of sudden steering. Thus, in case of sudden steering, determination may be more accurately performed, and mode transition may be immediately executed.

The apparatus for controlling an MDPS, which has the above-described configuration, may optimize the steering control authority of the vehicle according to a situation during autonomous driving, such that a driver can operate the vehicle more conveniently and more safely. That is, when the driver's steering intervention is needed in the autonomous driving mode of the vehicle, the apparatus may transfer the steering authority to the driver, and when the driver hands off the steering wheel, the apparatus may control the vehicle to maintain autonomous driving.

Figure 5:
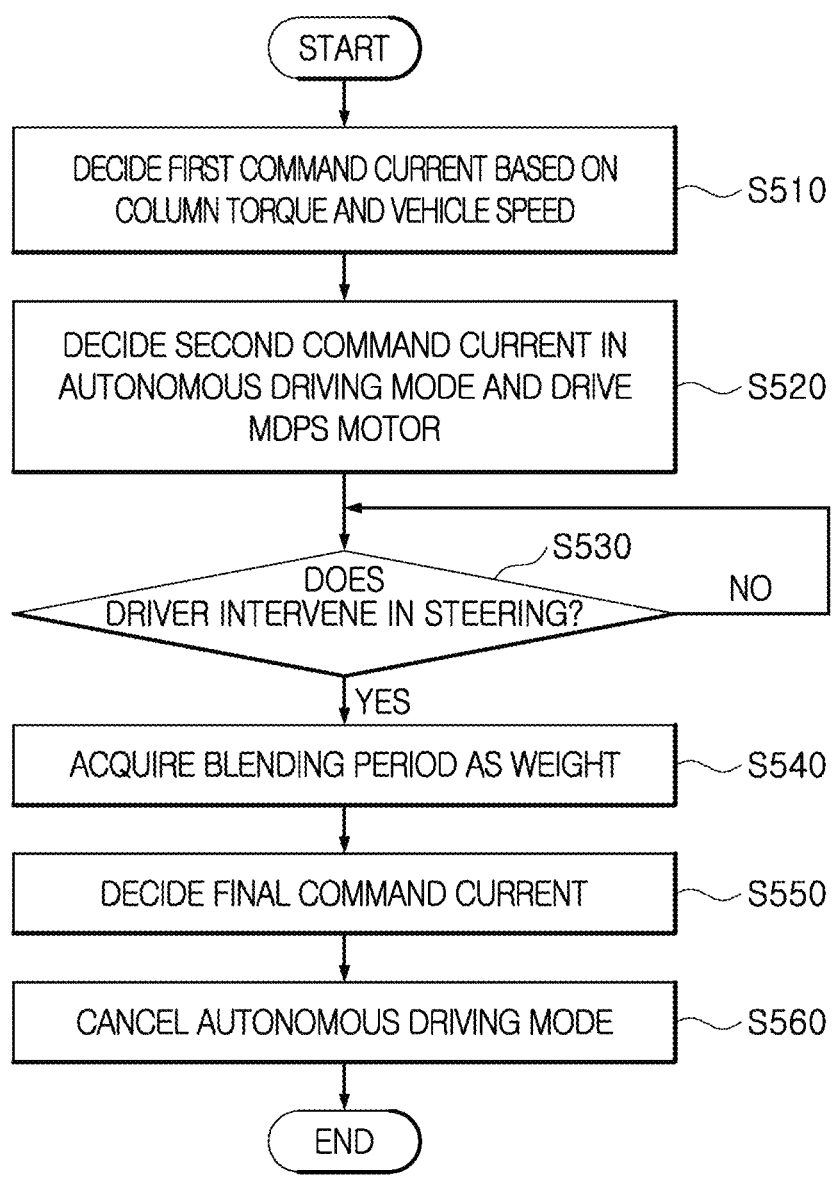
FIG. 5 is a flowchart for describing a method for controlling an MDPS system in accordance with an embodiment of the present embodiment.

FIG. 5 is a flowchart for describing a method for controlling an MDPS system in accordance with an embodiment of the present embodiment.

Referring to FIG. 5, the MDPS logic unit 300 decides a first command current based on column torque and vehicle speed, which are detected by the column torque sensor 100 and the vehicle speed sensor 200, respectively, in step S510. That is, the MDPS logic unit 300 may decide a first command current for driving the MDPS motor (not illustrated) in the manual driving mode of a driver, based on the column torque and the vehicle speed which are detected by the column torque sensor 100 and the vehicle speed sensor 200, respectively.

When step S510 is performed, the steering angle position control unit 500 decides a second command current for driving the MDPS motor in the autonomous driving mode based on the command steering angle inputted from the autonomous driving system 400 and the current steering angle from the steering angle sensor, and drives the MDPS motor, in step S520.

When step S520 is performed, the driver steering intervention determination unit 600 monitors the column torque of the column torque sensor 100 in the autonomous driving mode, and determines whether a driver has intervened in steering, in step S530. At this time, the driver steering intervention determination unit 600 performs noise filtering on the column torque detected by the column torque sensor 100 through the SF, and adjusts the holding period reference value which is the driver steering intervention determination reference time, according to the magnitude of the filtered column torque. Then, when the state in which the magnitude of the filtered column torque is equal to or more than a preset reference value is maintained for the adjusted holding period reference value, the driver steering intervention determination unit 600 may determine that the driver has intervened in steering.

When the determination result of step S530 indicates that the driver has intervened in steering, the driver steering intervention determination unit 600 acquires, as a weight, a blending period corresponding to the column torque when the holding period of the filtered column torque reaches the holding period reference value, in step S540.

When step S540 is performed, the output control unit 700 decides a final command current by applying the weight to the first and second command currents, in step S550, and completely cancels the autonomous driving mode in step S560. At this time, the output control unit 700 may control the magnitude of the final command current through a weight filter, i.e. an exponential smoothing filter.

Through the above-described processes, the driver may grasp the steering wheel to steer the vehicle during autonomous driving, without a command of completely canceling the autonomous driving mode.

As described above, when a driver rapidly cancels the autonomous driving mode and drives the vehicle in person because the driver does not instantaneously want autonomous driving or a driver's steering intervention is required to avoid an obstacle due to a momentary error of the autonomous driving system, the apparatus and method for controlling an MDPS in accordance with the embodiments of the present disclosure may accurately detect the situation, and transfer a steering authority to the driver. When the driver hands off the steering wheel, the apparatus and method may maintain the autonomous driving mode. Thus, the autonomous driving may smoothly transition depending on a situation, and the driver's convenience and safety may be maximized.

The apparatus and method for controlling an MDPS in accordance with the embodiments of the present disclosure may accurately recognize a driver's steering intervention, and prevent an unintended autonomous driving mode cancelation, thereby maximizing the driver's convenience.

The apparatus and method for controlling an MDPS in accordance with the embodiments of the present disclosure may vary the driver steering intervention determination condition in case of sudden steering depending on an emergency situation, thereby preventing an unintended mode cancelation.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a Motor Driven Power Steering (MDPS) system, comprising:
   a column torque sensor configured to detect column torque applied to a steering column of a vehicle;
   an MDPS logic unit configured to determine a first command current based on the column torque and vehicle speed, which are detected by the column torque sensor and a vehicle speed sensor, respectively;
   a steering angle position control unit configured to output a second command current for driving an MDPS motor in an autonomous driving mode based on a command steering angle input from an autonomous driving system and a current steering angle input from a steering angle sensor;
   a driver steering intervention determination unit configured to monitor the column torque in the autonomous driving mode and determine whether a driver has intervened in steering; and
   an output control unit configured to decide a final command current by applying a weight decided by the driver steering intervention determination unit to the first and second command currents when the driver's steering intervention occurs in the autonomous driving mode of the vehicle;
   wherein the driver steering intervention determination unit comprises:
      a filter unit configured to perform noise filtering on the column torque detected by the column torque sensor through a Band Stop Filter (BSF);
      a steering intervention determination unit configured to adjust a holding period reference value, which is a driver steering intervention determination reference time, according to a magnitude of the column torque filtered by the filter unit, and determine that the driver has intervened in steering, when a state in which the magnitude of the filtered column torque is greater than or equal to a preset reference value is maintained for the adjusted holding period reference value; and
      a weight calculation unit configured to acquire, as the weight, a blending period corresponding to the column torque when the holding period of the filtered column torque reaches the holding period reference value.

2. The apparatus of claim 1, further comprising a steering angle acceleration calculation unit configured to calculate steering angle acceleration by differentiating the command steering angle,
wherein the filter unit removes noise of the steering angle acceleration through low pass filter (LPF) processing, and
the steering intervention determination unit raises the holding period reference value based on the steering angle acceleration from which the noise has been removed, such that the autonomous driving mode is not canceled.

3. The apparatus of claim 1, wherein the steering intervention determination unit comprises a table map in which a holding period reference value for the magnitude of each column torque is stored, extracts a holding period reference value corresponding to the magnitude of the column torque detected through the column torque sensor from the table map, and adjusts the holding period reference value.

4. The apparatus of claim 1, wherein the weight calculation unit acquires a blending period, corresponding to the column torque when a holding period reaches the holding period reference value, from a column torque weight table in which a blending period is matched with each column torque, and the acquired blending period is acquired as the weight.

5. The apparatus of claim 1, wherein the driver steering intervention determination unit further comprises a steering angle phase detection unit configured to detect the phase of a steering angle from the steering angle sensor and the phase of a motor angle from an MDPS motor, respectively, and determines whether the driver has intervened in steering, based on the detected phases of the steering angle and the motor angle.

6. The apparatus of claim 5, wherein when the phase of the motor angle is detected before the phase of the steering angle, the steering angle phase detection unit determines that the driver did not intervene in steering.

7. A method for controlling a Motor Driven Power Steering (MDPS) system, comprising:
determining, by an MDPS logic unit, a first command current based on column torque and vehicle speed, which are detected by a column torque sensor and a vehicle speed sensor, respectively;
determining, by a steering angle position control unit, a second command current for driving an MDPS motor in an autonomous driving mode based on a command steering angle input from an autonomous driving system and a current steering angle input from a steering angle sensor, and driving the MDPS motor;
determining, by a driver steering intervention determination unit, whether a driver has intervened in steering by monitoring the column torque of the column torque sensor in the autonomous driving mode; and
deciding, by an output control unit, a final command current by applying a weight decided by the driver steering intervention determination unit to the first and second command currents when the driver's steering intervention occurs in the autonomous driving mode of the vehicle;
wherein determining whether the driver has intervened in steering, comprises:
performing, by a filter unit, noise filtering on the column torque detected by the column torque sensor through a Band Stop Filter (BSF);
adjusting, by a steering intervention determination unit, a holding period reference value that is a driver steering intervention determination reference time, according to the magnitude of the column torque filtered by the filter unit, and determining that the driver has intervened in steering when a state in which a magnitude of the filtered column torque is greater than or equal to a preset reference value is maintained for the adjusted holding period reference value; and
acquiring, by a weight calculation unit, a blending period corresponding to the column torque when the holding period of the filtered column torque reaches the holding period reference value as the weight.

8. The method of claim 7, wherein in performing the noise filtering,
the filter unit removes noise of steering angle acceleration through low pass filter (LPF) processing when a steering angle acceleration calculation unit calculates the steering angle acceleration by differentiating the command steering angle, and
in determining whether the driver has intervened in steering,
the steering intervention determination unit raises the holding period reference value based on the value from which the noise has been removed, such that the autonomous driving mode is not canceled.

9. The method of claim 7, wherein in determining whether the driver has intervened in steering,
the steering intervention determination unit comprises a table map in which a holding period reference value for the magnitude of each column torque is stored, extracts a holding period reference value corresponding to the magnitude of the column torque detected through the column torque sensor from the table map, and adjusts the holding period reference value.

10. The method of claim 7, wherein in acquiring the blending period, the weight calculation unit acquires a blending period corresponding to the column torque when a holding period reaches the holding period reference value from a column torque weight table in which a blending period is matched with each column torque, and the blending period is acquired as the weight.

11. The method of claim 7, further comprising detecting, by a steering angle phase detection unit, the phase of a steering angle from the steering angle sensor and the phase of a motor angle from an MDPS motor, and determining whether the driver has intervened in steering based on the detected phases of the steering angle and the motor angle.

12. The method of claim 11, wherein in determining whether the driver has intervened in steering, based on the detected phases of the steering angle and the motor angle,
the steering angle phase detection unit determines that the driver does not intervene in steering when the phase of the motor angle is detected before the phase of the steering angle.

* * * * *